(12) United States Patent
Hayes et al.

(10) Patent No.: US 7,393,591 B2
(45) Date of Patent: *Jul. 1, 2008

(54) HIGH-REFLECTIVITY POLYESTER COATING

(75) Inventors: Gregory Bryant Hayes, Bowling Green, KY (US); Thomas John Melnyk, Greenfield, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,966

(22) Filed: Jul. 13, 2007

(65) Prior Publication Data

US 2007/0269668 A1 Nov. 22, 2007

Related U.S. Application Data

(63) Continuation of application No. 11/211,806, filed on Aug. 25, 2005, now Pat. No. 7,244,506, which is a continuation of application No. 10/378,581, filed on Mar. 3, 2003, now Pat. No. 6,974,631.

(60) Provisional application No. 60/361,511, filed on Mar. 4, 2002.

(51) Int. Cl.
B32B 27/18 (2006.01)
B32B 27/20 (2006.01)
B32B 27/36 (2006.01)

(52) U.S. Cl. ............... 428/480; 428/328; 428/336; 528/302; 528/307; 528/308; 528/308.6; 528/308.7; 524/413; 106/436

(58) Field of Classification Search .......... None
See application file for complete search history.

(56) References Cited

U.S. PATENT DOCUMENTS 3,364,065 A * 1/1968 Cutright .............. 427/387
3,994,851 A * 11/1976 Chang ................. 524/598
4,186,227 A 1/1980 Wulff et al.
4,476,261 A * 10/1984 Patzschke et al. ........ 204/496
4,623,562 A * 11/1986 Breitenfellner et al. ... 427/296
4,877,819 A * 10/1989 Kiyohara et al. ......... 523/200
4,921,755 A * 5/1990 Carroll et al. ........... 428/328
5,010,458 A * 4/1991 Fraizer ................. 362/516
5,023,141 A * 6/1991 Willey .................. 428/458
5,246,557 A 9/1993 Hughes et al.
5,262,494 A * 11/1993 Smith et al. ............ 525/443
5,322,884 A * 6/1994 Wellman et al. ........ 524/601
5,334,652 A * 8/1994 Wellman et al. ........ 524/601
5,376,460 A * 12/1994 Hardeman et al. ...... 428/482
5,623,027 A * 4/1997 Lewarchik et al. ...... 525/466
5,991,080 A * 11/1999 Kohta et al. ............ 359/584
6,164,800 A * 12/2000 McIlwraith ............ 362/342
6,166,123 A * 12/2000 Blatter et al. .......... 524/441
6,172,159 B1 * 1/2001 Gaal et al. ............. 524/604
6,301,770 B1 * 10/2001 McIlwraith ............ 29/527.2
6,560,845 B2 * 5/2003 Serafin et al. .......... 29/469.5
6,641,290 B2 * 11/2003 Ishiharada ............. 362/495
6,974,631 B2 * 12/2005 Hayes et al. ........... 428/480
7,244,506 B2 * 7/2007 Hayes et al. ........... 428/480
2001/0036999 A1 * 11/2001 Yokohama et al. ....... 525/165

FOREIGN PATENT DOCUMENTS

EP 0 769 508 B1 10/2001
JP 10151412 6/1998
WO WO 99/18161 4/1999

* cited by examiner

Primary Examiner—Vivian Chen
(74) Attorney, Agent, or Firm—IPLM Group, P.A.

(57) ABSTRACT

A high reflectivity coated substrate and coating composition employing a binder that includes a cycloaliphatic group and contains a polyester resin having a number average molecular weight from about 1,000 to 40,000. The binder contains less than 40 weight percent aromatic group containing compound and the weight ratio of pigment to binder is greater than 0.9:1. When the binder is blended with rutile $TiO_2$ at a solids loading of 50 weight percent and coated to a dried film thickness of 0.00254 cm, the coating exhibits a Y-value of at least 85.5.

32 Claims, No Drawings

HIGH-REFLECTIVITY POLYESTER COATING

CROSS-REFERENCE TO RELATED APPLICATIONS

This application is a continuation of application Ser. No. 11/211,806 filed Aug. 25, 2005, now U.S. Pat. No. 7,244,506, which is in turn a continuation of application Ser. No. 10/378,581 filed Mar. 3, 2003 (now U.S. Pat. No. 6,974,631 B2), which claims the benefit of Provisional Application Ser. No. 60/361,511 filed Mar. 4, 2002, the entire disclosures of which are incorporated by reference herein.

BACKGROUND

Many types of lighting products use coated substrates as a light reflector. For example, fluorescent lamps often are fabricated using a sheet metal reflector that has been coated with a white coating. The coating protects the substrate from degradation (e.g., corrosion) as well as serving as the light reflector. Consequently, obtaining coatings with high reflectivity is a long sought goal. In general, the pigment loading of a coating (e.g., the $TiO_2$ loading in the case of a white coating) can affect the reflectivity, with the higher reflectivity levels being achieved at high pigment loading. Unfortunately, such pigments are quite expensive and the increased loading levels required in the conventional coatings makes the coatings expensive. To date, manufacturers have been unable to achieve high reflectivity at reasonable cost.

Many other types of coated articles (e.g., window blinds, rain gutters and downspouts) are formulated to have high reflectivity and/or whiteness. In the case of rain gutters and downspouts, large shares of the products are made in a white color. Unfortunately, these products often lose their pleasing white color after exposure to the outdoor elements. Also, the initial reflectivity is less than desired (i.e., the reflectivity value is lower than desired) or the reflectivity comes at too high a cost (i.e., the pigment loadings are too expensive for the market). In the case of window blinds (e.g., Venetian blinds) it is common to make the blinds using coated metal substrates. There is a strong desire to increase the range of colors available from the color spectrum. In particular, there is a desire for "brighter" colors. Unfortunately, the brighter colors are not available because of limits on reflectivity of the available coatings.

From the foregoing, it will be appreciated that what is needed in the art is a coating (preferably a low cost coating) that has extremely high reflectivity when applied to a substrate. Such coatings, articles made using these coatings, and methods for preparing the coatings and articles are disclosed and claimed herein.

SUMMARY

In one embodiment the present invention provides a lighting fixture article that includes a coated reflector and a light source. The reflector comprises a substrate coated with a coating composition. In preferred embodiments, the composition includes (i) a binder that comprises less than 40 weight percent aromatic group containing compound and that includes a polyester resin that contains a cycloaliphatic group, and (ii) a pigment. The preferred weight ratio of pigment to binder is greater than 0.9:1, and the binder, when blended with rutile TiO2 at a solids loading of 50 weight percent and coated to a dried film thickness of 0.00254 cm, preferably exhibits a Y-value of at least 85.5.

In another embodiment, the present invention provides coated substrates having high reflectivity.

In another embodiment, the present invention provides a coating composition that includes (i) a binder that comprises less than 40 weight percent aromatic group containing compound and that includes a polyester resin that contains a cycloaliphatic group, and (ii) a pigment. The preferred weight ratio of pigment to binder is greater than 0.9:1, and the binder, when blended with rutile TiO2 at a solids loading of 50 weight percent and coated to a dried film thickness of 0.00254 cm, preferably exhibits a Y-value of at least 85.5.

DEFINITIONS

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term cycloaliphatic group means an alicyclic group, but specifically excludes an aromatic group. The term "aromatic group" or "aryl group" means a mono-, di-, or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

Substitution is anticipated on the organic groups of the polyesters used in the coating compositions of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

DETAILED DESCRIPTION

The present invention provides lighting fixtures and other coated articles having high reflectivity. The fixtures and articles comprise a substrate coated with a coating composition. The coating composition comprises a binder and a pigment. The binder includes a polyester resin that includes a cycloaliphatic group, preferably in the resin backbone, and optional crosslinker or other optional additives (e.g., flow modifiers, viscosity modifiers, etc.).

In one embodiment, the polyester resin may be formed by reacting compounds having reactive functional groups, for example, compounds having alcohol, acid, anhydride, acyl or ester functional groups. Alcohol functional group are known to react, under proper conditions, with acid, anhydride, acyl or ester functional groups to form a polyester linkage.

Suitable compounds for use in forming the polyester resin include mono-, di-, and multi-functional compounds. Di-functional compounds are presently preferred. Suitable compounds include compounds having reactive functional groups of a single type (e.g., mono-, di-, or poly-functional alcohols; or mono-, di-, or poly-functional acids) as well as compounds having two or more different types of functional groups (e.g., a compound having both an anhydride and an acid group, or a compound having both an alcohol and an acid group, etc.).

At least a portion of the compounds used to form the polyester resin comprises a cycloaliphatic group. While not intending to be bound by theory, it is believed that the use of a cycloaliphatic group in the backbone of the resin contributes to improved reflectivity and/or increased UV stability (which is associated with outdoor weathering stability). With regard to reflectivity, it is believed that the use of a cycloaliphatic group containing compound in place of an aromatic group containing compound results in a lower refractive index for the cured binder, thereby increasing the refractive index mismatch between the inorganic pigment (e.g., TiO2) present in the coating and the binder. This mismatch is believed to contribute to the scatter of light and the overall reflectivity of the coating.

Reflectivity may be measured using a suitable spectrophotometer and recording the "Y" value for the coated article. Although coated articles may be constructed using different substrates and/or different coating thicknesses, comparison of coating compositions should be made using defined conditions as discussed herein.

Suitable cycloaliphatic group containing compounds for use in the present invention include (i) compounds having one or more, preferably two or more acid functional groups; (ii) compounds having an anhydride group; (iii) compounds having one or more, preferably two or more ester functional groups; and (iv) compounds having one or more, preferably two or more acyl functional groups. These compounds, in turn, may be reacted with alcohol containing compounds (which may also be cycloaliphatic group containing) to form polyester resins having cycloaliphatic group in the backbone of the resin.

Although the present invention is not so limited, it is convenient to discuss and exemplify polyesters formed from the reaction of polyols and polyacid (or anhydride) compounds, wherein a portion of the polyacid (or anhydride) compound comprises a cycloaliphatic group. It is understood, however, that the cycloaliphatic group may be introduced to the polyester via another compound (e.g., the polyol and/or optional crosslinker component).

Suitable cycloaliphatic group containing acid, ester and anhydride compounds for use in the present invention include cycloaliphatic polycarboxylic acids, esters and anhydrides such as, for example, cyclohexanedicarboxylic acids, esters and anhydrides. Suitable compounds include 1,2-, 1,3- and 1,4-cyclohexanedicarboxylic acids and their methyl esters; 1,2-isomer anhydride (e.g., hexahydrophthalic anhydride (HHPA)); and derivatives of each, e.g., derivatives in which one or more organic groups is bound to the cycloaliphatic rings. Presently preferred compounds include 1,2-cyclohexanedicarboxylic acid and its anhydride.

If desired, the polyester may also comprise an aliphatic acid, ester or anhydride compound. Suitable aliphatic acid, ester and anhydride compounds include aliphatic polycarboxylic acids such as succinic acid, glutaric acid, adipic acid, pimelic acid, suberic acid, azelaic acid, sebacic acid, diglycolic acid, 1,12-dodecanoic acid, tetrapropenyl succinic acid, maleic acid and its anhydride, fumaric acid, itaconic acid, malic acid, dimer fatty acids (e.g., EMPOL 1016), esters of these acids, etc. Presently preferred compounds include adipic acid and azelaic acid.

If desired, the polyester may also comprise an aromatic acid, ester or anhydride, however, the amount of such aromatic compound should be limited for the reasons discussed herein. Suitable aromatic acids, esters and anhydrides include aromatic polycarboxylic acids, esters and anhydrides such as phthalic acid and its anhydride, isophthalic acid, terephthalic acid and its dimethyl ester, benzophenone dicarboxylic acid, diphenic acid, 4,4-dicarboxydiphenyl ether, 2,5-pyridine dicarboxylic acid, 2,6-naphthalenedicarboxylic acid and its dimethyl ester, 4-hydroxybenzoic acid, trimellitic acid and its anhydride, etc. Presently preferred compounds include phthalic acid and its anhydride, and isophthalic acid.

Suitable polyols for use in the present invention includes aliphatic or cycloaliphatic polyols. Aromatic polyols, like aromatic acids, may be used in limited quantities. However, these compounds are believed to detract from the weathering stability and/or reflectivity of the coating.

Examples of suitable non-cyclic polyols include 1,6-hexanediol, pentaerythritol, trimethylolpropane, 2-methyl-1,3-propanediol, neopentyl glycol, 2-butyl-2-ethyl-1,3-propanediol, ethylene glycol, propylene glycol, 1,4-butanediol, 1,3-butanediol, 1,5-pentanediol, trimethylol ethane, 3-hydroxy-2,2-dimethylpropyl 3-hydroxy-2,2-dimethylpropionate (HPHP), etc. Presently preferred compounds include 2-methyl-1,3-propanediol and neopentyl glycol. Examples of suitable cycloaliphatic polyols include 1,2-, 1,3-, and 1,4-cyclohexanediol, 1,2-, 1,3-, and 1,4-cyclohexanedimethanol, hydrogenated bisphenol A, etc.

Preferably the polyester resin will comprise less than 20 weight percent, more preferably less than 15 weight percent, and most preferably less than 10 weight percent aromatic group containing compound.

Preferably the binder (e.g., polyester resin and optional crosslinker, etc.) will comprise less than 40 weight percent, more preferably less than 30 weight percent, most preferably less than 20 weight percent, and optimally less than 10 weight percent aromatic group containing compound.

The coating composition preferably has a pencil hardness of at least B, more preferably at least HB, and most preferably at least F.

The coating composition preferably has a flexibility of 4T or more flexible, more preferably at least 2T or more flexible, and most preferably at least 2T or more flexible when viewed at a 10× magnification (i.e., no cracks are visible when a 2T specimen is viewed under a 10× magnification glass). Hardness may be achieved in polyesters by using at least a portion of compounds (polyol or poly-acid) having functionality greater than 2, thereby providing substantial branching. Typically, the desired branching is achieved by using polyols of functionality greater than 2.

Preferred polyesters have hydroxyl numbers of from about 10 to 120, more preferably from about 20 to 90, and most preferably from about 20 to 40. Preferred polyesters have acid numbers from about 2 to 20, more preferably between about 5 and 10.

The number average molecular weight (Mn) of the polyester suitably may range from about 1,000 to 40,000, preferably between about 1,500 and 10,000.

The polyesters may be produced by any of the conventional processes, preferably with the use of a catalyst as well as passage of an inert gas through the reaction mixture. Esterification takes place almost quantitatively and may be monitored by determining the acid and/or hydroxyl numbers or by monitoring the Gardner-Holt viscosity of the product.

The polyesters are typically made up in organic solvents, such as 1-methoxy-2-propanol acetate, cyclohexanone, xylene, high boiling aromatic solvents, such as AROMATIC 100 and 150, etc., and mixtures thereof.

If desired, the binder may further comprise an optional crosslinker compound. The crosslinker may be used to facilitate cure of the coating and to build desired physical properties. Suitable crosslinkers include aromatic and non-aromatic crosslinkers. Again, for the reasons previously discussed, it is presently believed that limiting the total amount of aromaticity in the coating will provide coatings with the highest reflectivity. For that reason, it is expected that a non-aromatic crosslinker will be preferred over an aromatic crosslinker when all other considerations are equal.

Polyesters having hydroxyl groups are curable through the hydroxyl groups, e.g., (i) with aminoplasts, which are oligomers that are the reaction products of aldehydes, particularly formaldehyde, or (ii) with amino- or amido-group-carrying substances exemplified by melamine, urea, dicyandiamide, benzoguanamine and glycoluril, or (iii) with blocked isocyanates. Hydroxyl cross-linking agents are also described, for example in U.S. Pat. No. 2,940,944 and German patent applications 1,060,596, 1,083,548 and 1,089,549.

Suitable crosslinkers include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used for combining with the polyesters. Suitable amino crosslinking agents include those sold by Cytek under the trademark CYMEL (e.g., CYMEL 301, CYMEL 303, and CYMEL 385 alkylated melamine-formaldehyde resins, or mixtures or such resin, are useful) or by Solutia under the trademark RESIMENE. Hydroxyl-reactive cross-linking is generally provided in an amount sufficient to react with at least one-half the hydroxyl groups of the polyester, i.e., be present at least one-half the stoichiometric equivalent of the hydroxyl functionality. Preferably, the cross-linking agent is sufficient to substantially completely react with all of the hydroxyl functionality of the polyester, and cross-linking agents having nitrogen cross-linking functionality are provided in amounts of from about 2 to about 12 equivalents of nitrogen cross-linking functionality per equivalent of hydroxyl functionality of the polyester. This typically translates to an aminoplast being provided at between about 10 and about 70 phr.

Suitable crosslinkers also include blocked isocyanates. U.S. Pat. No. 5,246,557 describes some suitable blocked isocyanates. Blocked isocyanates are isocyanates in which each isocyanate group has reacted with a protecting or blocking agent to form a derivative which will dissociate on heating to remove the protecting or blocking agent and release the reactive isocyanate group. Compounds already known and used as blocking agents for polyisocyanates include aliphatic, cycloaliphatic or aralkyl monohydric alcohols, hydroxylamines and ketoximes. Preferred blocked polyisocyanates dissociate at temperatures of around 160° C. or lower. Lower dissociation temperatures are desirable (assuming the coating is still stable at ambient temperatures) for energy savings reasons and where heat sensitive materials are being utilized. The presence of a catalyst is preferred in order to increase the rate of reaction between the liberated polyisocyanate and the active hydrogen containing compound. The catalyst can be any catalyst known in the art, e.g. dibutyl tin dilaurate or triethylene diamine.

In addition to the polyester resin and optional crosslinker compound, the coating composition may contain up to about 60 wt. percent pigments and optional fillers.

Suitably, the pigment:binder weight ratio is at least 0.9:1, more preferably at least 0.95:1 and most preferably at least 1:1. In preferred embodiment, the pigment:binder weight ratio does not exceed about 1.4:1.

$TiO_2$ is a preferred pigment for the high reflectivity coatings of the present invention. A wide variety of $TiO_2$ fillers are suitable. It is presently preferred to utilize rutile $TiO_2$. If desired, the $TiO_2$ may be surface treated. The surface treatment used may be chosen to fit the particular purpose of the coating. For example, a coating made for an interior application may use a different treatment than one designed for exterior usage.

Other additives known in the art, such as flow modifiers, viscosity modifiers and other binders may be dispersed in the coating composition. A catalytic amount of a strong acid (e.g., p-toluenesulfonic acid) may be added to the composition to hasten the cross-linking reaction.

As previously mentioned, the coating composition may further comprise one or more carriers (e.g., solvents). Suitable carriers include 1-methoxy-2-propanol acetate, cyclohexanone, xylene, alcohol (e.g., butanol), high boiling aromatic solvents, such as AROMATIC 100, 150 and 200, etc., and mixtures thereof.

The coating composition thus obtained may be applied to sheet metal such as is used for lighting fixtures; architectural metal skins, e.g., gutter stock, window blinds, siding and window frames; and the like by spraying, dipping, or brushing but is particularly suited for a coil coating operation wherein the composition is wiped onto the sheet as it unwinds from a coil and then baked as the sheet travels toward an uptake coil winder.

The coating is typically cured or hardened at a temperature from about 100 to 300° C. For coil coating operations the coating is typically baked to a peak metal temperature of from about 210 to 254° C.

Use of the binders of the present invention allows the formulator to achieve high reflectivity at low applied cost. Low applied cost includes savings that may be achieved by using: (i) single pass coating methods (as opposed to the more expensive multi-pass coating methods necessitated for conventional coatings), (ii) by using thinner coatings (i.e., lower dft) than that required by conventional coatings to achieve a particular reflectivity value, or (iii) by using lower pigment loadings than that required by conventional binders to achieve a desired reflectivity value.

The following examples are offered to aid in understanding of the present invention and are not to be construed as limiting the scope thereof. Unless otherwise indicated, all parts and percentages are by weight.

The constructions cited were evaluated by tests as follows:

Reflectivity Test

For purposes of this invention the reflectivity of a coating was compared as follows:

The coating is applied in a single pass using a wire-round rod to a cold rolled steel panel (0.0483 mm thick) that had been previously treated with BONDERITE™ 902 pretreatment (Henkel). The panel is placed in a 324° C. (615° F.) oven to give a panel baked at a peak metal temperature of 232° C. (450° F.), and a dry film thickness of 1 mil (0.00254 cm). The gauge of the wire-round rod should be selected to achieve the 1 mil (0.00254 cm) dft. Dry film thickness (dft) is measured using a Crater Film Measurement System (DJH Designs, Inc). The color (L, a, b-values) and reflectance (Y) of each coating are measured using a Hunter D25-9 Colorimeter and D25 Optical Sensor (Hunter Associates Laboratory). In the event it is not feasible to produce a dry film thickness of exactly 1 mil (0.00254 cm), then specimens on either side of 1 mil target thickness may be measured and a best fit of the spectrophotometer data calculated to provide an estimated value for a specimen of the target 1 mil thickness.

When tested as described above, preferred coatings of the present invention provide a Y-value of at least 85.5, more preferably at least 86.5, and most preferably at least 87.5.

EXAMPLES

Example 1

Preparation of Polyester Materials

Run 1: Preparation of HHPA-Based Polymer (Polymer A)

6.1 moles of 2-methyl,1,3-propanediol (MP Diol), 6.2 moles hexahydrophthalic anhydride (HHPA), 0.6 moles of trimethylolpropane (TMP) and 0.1 part by weight dibutyl tin oxide were charged to a 3.0 liter flask equipped with an agitator, packed column, condenser, thermometer, and inert gas inlet. The reactor was flushed with inert gas and the reactants heated to 235° C. over 4.5 hours while removing water. After the reaction mixture was clear, azeotropic distillation was started using an aromatic hydrocarbon fraction (Aromatic 150) until an acid number lower than 7 was achieved.

The final acid number of the solid resin was 4.8. The viscosity measured as a 68% solution in Aromatic 150/Propylene glycol monomethyl ether acetate (1:1) was Y+ (Gardner Bubble).

Comparative Run 2: Preparation of PA-Based Polymer (Polymer B)

6.9 moles of 2-methyl,1,3-propanediol (MP Diol), 6.6 moles phthalic anhydride (PA), 0.7 moles of trimethylolpropane(TMP) and 0.1 part by weight dibutyl tin oxide were charged to a 3.0 liter flask equipped with an agitator, packed column, condenser, thermometer, and inert gas inlet. The reactor was flushed with inert gas and the reactants heated to 235° C. over 4.0 hours while removing water. After the reaction mixture was clear, azeotropic distillation was started using an aromatic hydrocarbon fraction (Aromatic 150) until an acid number lower than 7 was achieved.

The final acid number of the solid resin was 1.6. The viscosity measured as a 68% solution in Aromatic 150/Propylene glycol monomethyl ether acetate (1:1) was W+ (Gardner Bubble).

Run 3: Preparation of 1,4-CHDA-Based Polymer (Polymer C)

6.9 moles of 2-methyl,1,3-propanediol (MP Diol), 6.6 moles 1,4-cyclohexanedicarboxylic acid (1,4-CHDA), 0.7 moles of trimethylolpropane (TMP) and 0.1 part by weight dibutyl tin oxide were charged to a 3.0 liter flask equipped with an agitator, packed column, condenser, thermometer, and inert gas inlet. The reactor was flushed with inert gas and the reactants heated to 235° C. over 5.5 hours while removing water. After the reaction mixture was clear, azeotropic distillation was started using an aromatic hydrocarbon fraction (Aromatic 150) until an acid number lower than 7 was achieved.

The final acid number of the solid resin was 2.3. The viscosity measured as a 65% solution in Aromatic 150/Propylene glycol monomethyl ether acetate (1:1) was Q+ (Gardner Bubble).

Run 4: Preparation of 1,3-CHDA-Based Polymer (Polymer D)

6.9 moles of 2-methyl,1,3-propanediol (MP Diol), 6.6 moles 1,3-cyclohexanedicarboxylic acid (1,3-CHDA), 0.7 moles of trimethylolpropane(TMP) and 0.1 part by weight dibutyl tin oxide were charged to a 3.0 liter flask equipped with an agitator, packed column, condenser, thermometer, and inert gas inlet. The reactor was flushed with inert gas and the reactants heated to 235° C. over 5.0 hours while removing water. After the reaction mixture was clear, azeotropic distillation was started using an aromatic hydrocarbon fraction (Aromatic 150) until an acid number lower than 7 was achieved.

The final acid number of the solid resin was 1.1. The viscosity measured as a 68% solution in Aromatic 150/Propylene glycol monomethyl ether acetate (1:1) was W− (Gardner Bubble).

Comparative Run 5: Preparation of IPA-Based Polymer (Polymer E)

5.5 moles of 2-methyl,1,3-propanediol (MP Diol), 5.3 moles isophthalic acid (IPA), 0.5 moles of trimethylolpropane(TMP) and 0.1 part by weight dibutyl tin oxide were charged to a 3.0 liter flask equipped with an agitator, packed column, condenser, thermometer, and inert gas inlet. The reactor was flushed with inert gas and the reactants heated to 235° C. over 6.0 hours while removing water. After the reaction mixture was clear, azeotropic distillation was started using an aromatic hydrocarbon fraction (Aromatic 150) until an acid number lower than 7 was achieved.

The final acid number of the solid resin was 1.0. The viscosity measured as a 70% solution in Aromatic 150/Propylene glycol monomethyl ether acetate (1:1) was Z6+ (Gardner Bubble).

Comparative Run 6: Preparation of TPA/PA Based Polymer (Polymer F)

5.5 moles of 2-methyl,1,3-propanediol (MP Diol), 4.3 moles of terephthalic acid (TPA), 1.1 moles phthalic anhydride (PA), 0.5 moles of trimethylolpropane (TMP) and 0.1 part by weight dibutyl tin oxide were charged to a 3.0 liter flask equipped with an agitator, packed column, condenser, thermometer, and inert gas inlet. The reactor was flushed with inert gas and the reactants heated to 235° C. over 5.0 hours while removing water. After the reaction mixture was clear, azeotropic distillation was started using an aromatic hydrocarbon fraction (Aromatic 150) until an acid number lower than 7 was achieved.

The final acid number of the solid resin was 1.3. The viscosity measured as a 66% solution in Aromatic 150/Propylene glycol monomethyl ether acetate (1:1) was Z6+ (Gardner Bubble).

Example 2

Preparation of Coating Formulations

Run 1: Preparation of Coating Containing HHPA-Based Polymer

A coating was made by first dispersing 200-grams of titanium dioxide (RCl-9, a rutile TiO2 available from Millennium Chemical and having an aluminum hydroxide surface treatment and a 325 mesh size) in 73.2-grams of polymer A and 9-grams of ethylene glycol monobutyl ether until a Hegman reading of 7+ was obtained. Subsequently, 175.7-grams of polymer A, 30-grams of RESIMENE™ 747 (Solutia), 13-grams of n-butanol, 13-grams of xylene, 13-grams of Aromatic 100, 2.0-grams of CYCAT™ 4040 PTSA solution (Cytec), and 1.0-gram of LINDRON™ 22 (Lindau Chemicals) were added and mixed thoroughly. The coating was adjusted to a viscosity of 21 seconds on a #4 Zahn cup 25° C. (77° F.) using xylene solvent.

Comparative Run 2: Preparation of Coating Containing PA-Based Polymer

A coating was made by first dispersing 200-grams of titanium dioxide (RCl-9, Millennium Chemical) in 84.3-grams of polymer B, 9-grams of ethylene glycol monobutyl ether, and 8.3-grams of xylene until a Hegman reading of 7+ was obtained. Subsequently, 164.4-grams of polymer B, 30-grams of RESIMENE 747 (Solutia), 8-grams of n-butanol, 8-grams of xylene, 8-grams of Aromatic 100, 2.0-grams of CYCAT 4040 PTSA solution (Cytec), and 1.0-gram of LINDRON 22 (Lindau Chemicals) were added and mixed thoroughly. The coating was adjusted to a viscosity of 19 seconds on a #4 Zahn cup 25° C. (77° F.) using xylene solvent.

Run 3: Preparation of Coating Containing 1,4-CHDA-Based Polymer

A coating was made by first dispersing 200-grams of titanium dioxide (RCl-9, Millennium Chemical) in 107.9-grams of polymer C and 9-grams of ethylene glycol monobutyl ether until a Hegman reading of 7+ was obtained. Subsequently, 153.6-grams of polymer C, 30-grams of RESIMENE 747 (Solutia), 8-grams of n-butanol, 8-grams of xylene, 8-grams of Aromatic 100, 2.0-grams of CYCAT 4040 PTSA solution (Cytec), and 1.0-gram of LINDRON 22 (Lindau Chemicals) were added and mixed thoroughly. The coating was adjusted to a viscosity of 22 seconds on a #4 Zahn cup 25° C. (77° F.) using xylene solvent.

Run 4: Preparation of Coating Containing 1,3-CHDA-Based Polymer

A coating was made by first dispersing 200-grams of titanium dioxide (RCl-9, Millennium Chemical) in 119.1-grams of polymer D, 9-grams of ethylene glycol monobutyl ether, and 5-grams of xylene until a Hegman reading of 7+ was obtained. Subsequently, 132.8-grams of polymer D, 30-grams of RESIMENE 747 (Solutia), 13-grams of n-butanol, 13-grams of xylene, 13-grams of Aromatic 100, 2.0-grams of CYCAT 4040 PTSA solution (Cytec), and 1.0-gram of LINDRON 22 (Lindau Chemicals) were added and mixed thoroughly. The coating was adjusted to a viscosity of 20 seconds on a #4 Zahn cup 25° C. (77° F.) using xylene solvent.

Comparative Run 5: Preparation of Coating Containing IPA-Based Polymer

A coating was made by first dispersing 200-grams of titanium dioxide (RCl-9, Millennium Chemical) in 100.8-grams of polymer E, 9-grams of ethylene glycol monobutyl ether, and 10-grams of xylene until a Hegman reading of 7+ was obtained. Subsequently, 139.9-grams of polymer E, 30-grams of RESIMENE 747 (Solutia), 24-grams of n-butanol, 24-grams of xylene, 24-grams of Aromatic 100, 2.0-grams of CYCAT 4040 PTSA solution (Cytec), and 1.0-gram of LINDRON 22 (Lindau Chemicals) were added and mixed thoroughly. The coating was adjusted to a viscosity of 22 seconds on a #4 Zahn cup 25° C. (77° F.) using xylene solvent.

Comparative Run 6: Preparation of Coating Containing TPA/PA Based Polymer

A coating was made by first dispersing 200-grams of titanium dioxide (RCl-9, Millennium Chemical) in 75.9-grams of polymer F, 9-grams of ethylene glycol monobutyl ether, and 10-grams of xylene until a Hegman reading of 7+ was obtained. Subsequently, 182.1-grams of polymer F, 30-grams of RESIMENE 747 (Solutia), 20-grams of n-butanol, 20-grams of xylene, 20-grams of Aromatic 100, 2.0-grams of CYCAT 4040 PTSA solution (Cytec), and 1.0-gram of LINDRON 22 (Lindau Chemicals) were added and mixed thoroughly. The coating was adjusted to a viscosity of 23 seconds on a #4 Zahn cup 25° C. (77° F.) using xylene solvent.

Example 3

Preparation of Coated Panels

The coatings of Example 2, Runs 1 and 2 were applied side-by-side using various wire-round rods to a cold rolled steel panel (0.019-inch thick, (0.0483 cm)) which had been previously treated with BONDERITE 902 pretreatment (Henkel). The panel was placed in a 615° F. (324° C.) oven to give a panel baked at a peak metal temperature of 450° F. (232° C.), having a dry film thickness as specified in Table A. The dry film thickness (dft) of each coating was measured using a Crater Film Measurement System (DJH Designs, Inc). The color (L, a, b-values) and reflectance (Y) of each coating was measured using a Hunter D25-9 Colorimeter and D25 Optical Sensor (Hunter Associates Laboratory), Table A compares panels of varying film thickness. Coating color and reflectance properties are set forth in Table A.

TABLE A

Single coat panels, example Polymers A and B.

| Wire Rod | dft (mils) | dft (μm) | Hunter Y | L | a | b |
|---|---|---|---|---|---|---|
| Formulation A | | | | | | |
| 8 | 0.24 | 0.6096 | 66.79 | 82.19 | −1.36 | −6.09 |
| 12 | 0.33 | 0.8382 | 70.59 | 84.38 | −1.27 | −5.38 |
| 16 | 0.5 | 1.27 | 78.42 | 88.63 | −1.2 | −3.92 |
| 20 | 0.6 | 1.524 | 81.35 | 90.2 | −1.05 | −3.23 |
| 24 | 0.76 | 1.9304 | 83.45 | 91.42 | −1.01 | −2.78 |
| 28 | 0.84 | 2.1336 | 84.32 | 91.87 | −0.96 | −2.55 |
| 32 | 1.12 | 2.8448 | 87.49 | 93.6 | −0.96 | −1.67 |
| 36 | 1.21 | 3.0734 | 88.26 | 94.03 | −0.91 | −1.41 |
| 40 | 1.42 | 3.6068 | 88.56 | 94.11 | −0.7 | −1.1 |
| Formulation B | | | | | | |
| 8 | 0.27 | 0.6858 | 63.11 | 79.81 | −1.39 | −6.62 |
| 12 | 0.36 | 0.9144 | 67.72 | 82.64 | −1.27 | −5.79 |

TABLE A-continued

Single coat panels, example Polymers A and B.

| Wire Rod | dft (mils) | dft (μm) | Hunter Y | L | a | b |
|---|---|---|---|---|---|---|
| 16 | 0.51 | 1.2954 | 75.29 | 86.75 | −1.3 | −4.47 |
| 20 | 0.69 | 1.7526 | 78.33 | 88.52 | −1.16 | −3.83 |
| 24 | 0.82 | 2.0828 | 80.62 | 89.8 | −1.18 | −3.26 |
| 28 | 0.85 | 2.159 | 81.45 | 90.21 | −1.06 | −3.1 |
| 32 | 1.14 | 2.8956 | 84.99 | 92.22 | −1.02 | −2.14 |
| 36 | 1.25 | 3.175 | 86.19 | 92.8 | −0.92 | −1.86 |
| 40 | 1.41 | 3.5814 | 86.73 | 93.13 | −0.75 | −1.49 |

The above data were fitted using a third order polynomial and the "Y" value estimated for a specimen having a dft of 1 mil (0.00254 cm). The Y value for Formula A was estimated to be 86.598, and the Y value for Formula B was estimated to be 83.456.

Example 4

Preparation of Coated Panels (Split Coating)

The coatings of Example 2, Runs 1 and 2 were applied side-by-side using various wire-round rods to a cold rolled steel panel (0.019-inch thick, (0.0483 cm)) that had been previously treated with BONDERITE 902 pretreatment (Henkel). The panel was placed in a 615° F. (324° C.) oven to give a panel baked at a peak metal temperature of 450° F. (232° C.). A ⅛-inch (0.317 cm) cut was then made on the outside edges of the panel. The coatings of Example 2, Runs 1 and 2 were then re-applied side-by-side over the original coating using the same wire-round rod. This yielded a panel having a dry film thickness as specified in Table B. The dry film thickness (dft) of each coating was measured using a Crater Film Measurement System (DJH Designs, Inc). The color (L, a, b-values) and reflectance (Y) of each coating was measured using a Hunter D25-9 Colorimeter and D25 Optical Sensor (Hunter Associates Laboratory). Table B compares panels of varying film thickness. Coating color and reflectance properties are set forth in Table B.

TABLE B

Split coat panels, example Polymers A and B.

| Wire Rod | dft (mils) | dft (μm) | Hunter Y | L | a | b |
|---|---|---|---|---|---|---|
| Formulation A | | | | | | |
| 3 | 0.31 | 0.7874 | 66.52 | 80.56 | −0.4 | −6.64 |
| 8 | 0.54 | 1.3716 | 78.33 | 88.5 | −0.86 | −3.71 |
| 14 | 0.82 | 2.0828 | 84.3 | 91.82 | −0.76 | −2.18 |
| 18 | 1.11 | 2.8194 | 86.95 | 93.25 | −0.71 | −1.31 |
| 22 | 1.33 | 3.3782 | 88.23 | 93.93 | −0.73 | −0.74 |
| 26 | 1.56 | 3.9624 | 89.13 | 94.41 | −0.64 | −0.69 |
| Formulation B | | | | | | |
| 3 | 0.34 | 0.8636 | 66.8 | 81.73 | −0.23 | −6.75 |
| 8 | 0.48 | 1.2192 | 75.74 | 86.84 | −0.97 | −4.14 |
| 14 | 0.85 | 2.159 | 81.95 | 90.53 | −0.81 | −2.6 |
| 18 | 1.18 | 2.9972 | 84.84 | 92.11 | −0.75 | −1.74 |
| 22 | 1.36 | 3.4544 | 86.09 | 92.79 | −0.73 | −1.27 |
| 26 | 1.49 | 3.7846 | 87.1 | 93.33 | −0.69 | −1.02 |

The above data were fitted using a third order polynomial and the "Y" value estimated for a specimen having a dft of 1 mil (0.00254 cm). The Y value for Formula A was estimated to be 86.56, and the Y value for Formula B was estimated to be 83.88.

Example 5

Preparation of Coated Panels

The coatings of Example 2, Runs 3 and 4 were applied side-by-side using various wire-round rods to a cold rolled steel panel (0.019-inch thick, (0.0483 cm)) that had been previously treated with BONDERITE 902 pretreatment (Henkel). The panel was placed in a 615° F. (324° C.) oven to give a panel baked at a peak metal temperature of 450° F. (232° C.), having a dry film thickness as specified in Table C. The dry film thickness (dft) of each coating was measured using a Crater Film Measurement System (DJH Designs, Inc). The color (L, a, b-values) and reflectance (Y) of each coating was measured using a Hunter D25-9 Colorimeter and D25 Optical Sensor (Hunter Associates Laboratory). Table C compares panels of varying film thickness. Coating color and reflectance properties are set forth in Table C.

TABLE C

Single coat panels, example Polymer C and D.

| Wire Rod | dft (mils) | dft (μm) | Hunter Y | L | a | b |
|---|---|---|---|---|---|---|
| Formulation C | | | | | | |
| 8 | 0.25 | 0.635 | 69.06 | 83.1 | −1.01 | −5.84 |
| 12 | 0.31 | 0.7874 | 73.09 | 85.49 | −0.95 | −4.97 |
| 16 | 0.51 | 1.2954 | 79.6 | 89.22 | −1.14 | −3.68 |
| 20 | 0.61 | 1.5494 | 82.55 | 90.86 | −1.04 | −3.04 |
| 24 | 0.76 | 1.9304 | 84.45 | 91.9 | −0.98 | −2.53 |
| 28 | 0.81 | 2.0574 | 85.13 | 92.27 | −0.96 | −2.36 |
| 32 | 1.07 | 2.7178 | 87.94 | 93.78 | −0.83 | −1.6 |
| 36 | 1.24 | 3.1496 | 88.27 | 93.95 | −0.7 | −1.25 |
| 40 | 1.42 | 3.6068 | 89.22 | 94.46 | −0.68 | −1.16 |
| Formulation D | | | | | | |
| 8 | 0.24 | 0.6096 | 67.34 | 82.06 | −1.09 | −5.89 |
| 12 | 0.33 | 0.8382 | 72.37 | 85.07 | −1.01 | −4.98 |
| 16 | 0.5 | 1.27 | 78.74 | 88.74 | −1.15 | −3.71 |
| 20 | 0.65 | 1.651 | 81.9 | 90.5 | −1.04 | −3.07 |
| 24 | 0.71 | 1.8034 | 83.74 | 91.51 | −1.02 | −2.62 |
| 28 | 0.79 | 2.0066 | 84.4 | 91.87 | −1.02 | −2.46 |
| 32 | 1.1 | 2.794 | 87.64 | 93.62 | −0.89 | −1.61 |
| 36 | 1.24 | 3.1496 | 88.03 | 93.82 | −0.74 | −1.31 |
| 40 | 1.4 | 3.556 | 89.19 | 94.44 | −0.72 | −1.12 |

The above data were fitted using a third order polynomial and the "Y" value estimated for a specimen having a dft of 1 mil (0.00254 cm). The Y value for Formula C was estimated to be 87.124, and the Y value for Formula D was estimated to be 86.735.

Example 6

Preparation of Coated Panels (Split Coating)

The coatings of Example 2, Runs 3 and 4 were applied side-by-side using various wire-round rods to a cold rolled steel panel (0.019-inch thick, (0.0483 cm)) that had been previously treated with BONDERITE 902 pretreatment (Henkel). The panel was placed in a 615° F. (324° C.) oven to give a panel baked at a peak metal temperature of 450° F. (232° C.). A ⅛-inch (0.3175 cm) cut was then made on the outside edges of the panel. Formulation C and Formulation D were then re-applied side-by-side over the original coating using the same wire-round rod. This yielded a panel having a dry film thickness as specified in Table D. The dry film thickness (dft) of each coating was measured using a Crater Film Measurement System (DJH Designs, Inc). The color (L, a, b-values) and reflectance (Y) of each coating was measured using a Hunter D25-9 Colorimeter and D25 Optical Sensor (Hunter Associates Laboratory). Table D compares panels of varying film thickness. Coating color and reflectance properties are set forth in Table D.

TABLE D

Split coat panels, example Polymers C and D.

| Wire Rod | dft (mils) | dft (μm) | Hunter Y | L | a | b |
|---|---|---|---|---|---|---|
| Formulation C | | | | | | |
| 3 | 0.24 | 0.6096 | 65.98 | 81.23 | −0.88 | −6.71 |
| 8 | 0.55 | 1.397 | 80.47 | 89.71 | −1.15 | −3.67 |
| 14 | 0.89 | 2.2606 | 86.39 | 92.94 | −0.83 | −2.07 |
| 18 | 1.18 | 2.9972 | 88.94 | 94.31 | −0.69 | −1.41 |
| 22 | 1.42 | 3.6068 | 90.35 | 95.05 | −0.64 | −0.93 |
| 26 | 1.6 | 4.064 | 90.89 | 95.34 | −0.64 | −0.73 |
| Formulation D | | | | | | |
| 3 | 0.25 | 0.635 | 67.38 | 82.08 | −0.75 | −6.19 |
| 8 | 0.53 | 1.3462 | 79.66 | 89.25 | −1.07 | −3.6 |
| 14 | 0.92 | 2.3368 | 85.89 | 92.68 | −0.83 | −2.03 |
| 18 | 1.18 | 2.9972 | 88.47 | 94.06 | −0.75 | −1.43 |
| 22 | 1.4 | 3.556 | 89.75 | 94.74 | −0.7 | −1 |
| 26 | 1.57 | 3.9878 | 90.48 | 95.12 | −0.65 | −0.77 |

The above data were fitted using a third order polynomial and the "Y" value estimated for a specimen having a dft of 1 mil (0.00254 cm). The Y value for Formula C was estimated to be 87.95, and the Y value for Formula D was estimated to be 87.21.

Example 7

Preparation of Coated Panels

The coatings of Example 2, Runs 5 and 6 were applied side-by-side using various wire-round rods to a cold rolled steel panel (0.019-inch thick, (0.0483 cm)) that had been previously treated with BONDERITE 902 pretreatment (Henkel). The panel was placed in a 615° F. (324° C.) oven to give a panel baked at a peak metal temperature of 450° F. (232° C.), having a dry film thickness as specified in Table E. The dry film thickness (dft) of each coating was measured using a Crater Film Measurement System (DJH Designs, Inc). The color (L, a, b-values) and reflectance (Y) of each coating was measured using a Hunter D25-9 Colorimeter and D25 Optical Sensor (Hunter Associates Laboratory). Table E compares panels of varying film thickness. Coating color and reflectance properties are set forth in Table E.

TABLE E

Single coat panels, example Polymers E and F.

| Wire Rod | dft (mils) | dft (μm) | Hunter Y | L | a | b |
|---|---|---|---|---|---|---|
| Formulation E | | | | | | |
| 10 | 0.26 | 0.6604 | 60.15 | 77.55 | −1.19 | −6.69 |
| 14 | 0.41 | 1.0414 | 70.23 | 83.8 | −1.12 | −5.06 |
| 18 | 0.5 | 1.27 | 75.45 | 86.83 | −1.2 | −4.18 |
| 22 | 0.61 | 1.5494 | 78.14 | 88.45 | −1.17 | −3.56 |
| 26 | 0.72 | 1.8288 | 79.91 | 89.39 | −1.19 | −3.22 |
| 30 | 0.87 | 2.2098 | 81.09 | 90.05 | −1.07 | −2.93 |
| 34 | 0.98 | 2.4892 | 84.32 | 91.82 | −1.01 | −2.13 |
| 38 | 1.16 | 2.9464 | 85.18 | 92.29 | −0.86 | −1.75 |
| Formulation F | | | | | | |
| 10 | 0.26 | 0.6604 | 61.07 | 78.14 | −1.19 | −6.81 |
| 14 | 0.38 | 0.9652 | 71.03 | 84.25 | −1.14 | −5.08 |
| 18 | 0.58 | 1.4732 | 76.48 | 87.42 | −1.22 | −4.12 |
| 22 | 0.68 | 1.7272 | 79.16 | 88.97 | −1.13 | −3.49 |
| 26 | 0.77 | 1.9558 | 80.8 | 89.89 | −1.08 | −0.312 |
| 30 | 0.84 | 2.1336 | 82.11 | 90.62 | −1.13 | −2.79 |
| 34 | 1.04 | 2.6416 | 84.79 | 92.08 | −0.98 | −2.03 |
| 38 | 1.16 | 2.9464 | 85.27 | 92.34 | −0.82 | −1.68 |

The above data were fitted using a third order polynomial and the "Y" value estimated for a specimen having a dft of 1 mil (0.00254 cm). The Y value for Formula E was estimated to be 83.534, and the Y value for Formula F was estimated to be 83.24.

Example 8

Preparation of Coated Panels (Split Coating)

The coatings of Example 2, Runs 5 and 6 were applied side-by-side using various wire-round rods to a cold rolled steel panel (0.019-inch thick, (0.0483 cm)) that had been previously treated with BONDERITE 902 pretreatment (Henkel). The panel was placed in a 615° F. (324° C.) oven to give a panel baked at a peak metal temperature of 450° F. (232° C.). A ⅛-inch (0.3175 cm) cut was then made on the outside edges of the panel. Formulation E and Formulation F were then re-applied side-by-side over the original coating using the same wire-round rod. This yielded a panel having a dry film thickness as specified in Table F. The dry film thickness (dft) of each coating was measured using a Crater Film Measurement System (DJH Designs, Inc). The color (L, a, b-values) and reflectance (Y) of each coating was measured using a Hunter D25-9 Colorimeter and D25 Optical Sensor (Hunter Associates Laboratory). Table F compares panels of varying film thickness. Coating color and reflectance properties are set forth in Table F.

TABLE F

Split coat panels, example Polymer E and F.

| Wire Rod | dft (mils) | dft (μm) | Hunter Y | L | a | b |
|---|---|---|---|---|---|---|
| Formulation E | | | | | | |
| 3 | 0.35 | 0.889 | 65.14 | 80.71 | 0.45 | −6.89 |
| 10 | 0.49 | 1.2446 | 74.19 | 86.14 | −0.95 | −4.36 |
| 16 | 0.94 | 2.3876 | 83.25 | 91.24 | −0.79 | −2.47 |
| 20 | 1.04 | 2.6416 | 85.66 | 92.55 | −0.75 | −1.79 |
| 24 | 1.27 | 3.2258 | 86.96 | 93.25 | −0.71 | −1.41 |
| 28 | 1.46 | 3.7084 | 87.03 | 93.29 | −0.64 | −1.31 |
| Formulation F | | | | | | |
| 3 | 0.32 | 0.8128 | 63.47 | 80.71 | 0.45 | −6.89 |
| 10 | 0.48 | 1.2192 | 74.13 | 86.1 | −0.97 | −4.59 |
| 16 | 0.91 | 2.3114 | 83.71 | 91.49 | −0.79 | −2.47 |
| 20 | 1.13 | 2.8702 | 86.18 | 92.83 | −0.69 | −1.71 |
| 24 | 1.33 | 3.3782 | 87.13 | 93.34 | −0.7 | −1.36 |
| 28 | 1.4 | 3.556 | 87.7 | 93.65 | −0.73 | −1.25 |

The above data were fitted using a third order polynomial and the "Y" value estimated for a specimen having a dft of 1 mil (0.00254 cm). The Y value for Formula E was estimated to be 85.03, and the Y value for Formula F was estimated to be 84.97.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A coated substrate article comprising
a substrate coated with a coating composition, wherein the coating composition comprises:
   (i) a binder that includes a cycloaliphatic group and comprises a polyester resin having a number average molecular weight from about 1,000 to 40,000, the binder comprising less than 40 weight percent aromatic group containing compound, and
   (ii) a pigment,
wherein the weight ratio of pigment to binder is greater than 0.9:1, and wherein the binder, when blended with rutile $TiO_2$ at a solids loading of 50 weight percent and coated to a dried film thickness of 0.00254 cm, exhibits a Y-value of at least 85.5.

2. The coated substrate of claim 1, wherein the polyester resin has a number average molecular weight between about 1,500 and 10,000.

3. The coated substrate of claim 1, wherein the polyester resin has a pencil hardness of at least HB.

4. The coated substrate of claim 1, wherein the polyester resin has a flexibility of at least 2T and no cracks are visible when a 2T specimen is viewed at a 10× magnification.

5. The coated substrate of claim 1, wherein the polyester resin has a hydroxyl number from about 20 to 90.

6. The coated substrate of claim 1, wherein the polyester resin has an acid number from about 2 to 20.

7. The coated substrate of claim 1, wherein the polyester resin has an acid number between about 5 and 10.

8. The coated substrate of claim 1, wherein the polyester resin includes the cycloaliphatic group in the resin backbone.

9. The coated substrate of claim 1, wherein the binder includes the cycloaliphatic group in a crosslinker compound.

10. The coated substrate of claim 1, wherein the substrate comprises a lighting fixture reflector.

11. The coated substrate of claim 1, wherein the substrate comprises an architectural metal skin.

12. The coated substrate of claim 11, wherein the architectural metal skin comprises gutter stock, window blinds, siding or a window frame.

13. A coating composition comprising:
   (i) a binder that includes a cycloaliphatic group and comprises a polyester resin having a number average molecular weight from about 1,000 to 40,000, the binder comprising less than 40 weight percent aromatic group containing compound, and
   (ii) a pigment,
wherein the weight ratio of pigment to binder is greater than 0.9:1, and wherein the binder, when blended with rutile $TiO_2$ at a solids loading of 50 weight percent and coated to a dried film thickness of 0.00254 cm, exhibits a Y-value of at least 85.5.

14. The coating composition of claim 13, wherein the polyester resin has a number average molecular weight between about 1,500 and 10,000.

15. The coating composition of claim 13, wherein the polyester resin has a pencil hardness of at least HB.

16. The coating composition of claim 13, wherein the polyester resin has a flexibility of at least 2T and no cracks are visible when a 2T specimen is viewed at a 10× magnification.

17. The coating composition of claim 13, wherein the polyester resin has a hydroxyl number from about 20 to 90.

18. The coating composition of claim 13, wherein the polyester resin has an acid number from about 2 to 20.

19. The coating composition of claim 13, wherein the polyester resin has an acid number between about 5 and 10.

20. The coating composition of claim 13, wherein the polyester resin is formed from the reaction of one or more polyols and a cycloaliphatic polycarboxylic acid, ester or anhydride.

21. The coating composition of claim 13, wherein the polyester resin is formed from the reaction of one or more polyols and a compound comprising a 1,2-, 1,3- or 1,4-cyclohexanedicarboxylic acid or its methyl ester; a 1,2-isomer anhydride; or derivative of such compound.

22. The coating composition of claim 13, wherein the binder comprises less than 20 weight percent aromatic group containing compound.

23. The coating composition of claim 13, wherein the binder comprises less than 10 weight percent aromatic group containing compound.

24. The coating composition of claim 13, wherein the pigment:binder weight ratio is at least 1:1 and less than 1.4:1.

25. The coating composition of claim 13, wherein the binder, when blended with rutile $TiO_2$ at a solids loading of 50 weight percent and coated to a dried film thickness of 0.00254 cm, exhibits a Y-value of at least 87.5.

26. The coating composition of claim 13, wherein a cured or hardened coating formed from the coating composition exhibits a Y-value of at least 85.5.

27. The coating composition of claim 13, wherein a cured or hardened coating formed from the coating composition exhibits a Y-value of at least 86.5.

28. The coating composition of claim 13, wherein a cured or hardened coating formed from the coating composition exhibits a Y-value of at least 87.5.

29. The coating composition of claim 13, wherein the pigment is white.

30. The coating composition of claim 13, wherein the polyester resin is formed from a polyol consisting essentially of 1,6-hexanediol, pentaerythritol, trimethylolpropane, 2-methyl-1,3-propanediol, neopentyl glycol, 2-butyl-2-ethyl-1,3-propanediol, ethylene glycol, propylene glycol, 1,4-butanediol, 1,3-butanediol, 1,5-pentanediol, trimethylol ethane, 3-hydroxy-2,2-dimethylpropyl 3-hydroxy-2,2-dimethylpropionate, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol or hydrogenated bisphenol A.

31. The coating composition of claim 13, wherein the polyester resin includes the cycloaliphatic group in the resin backbone.

32. The coating composition of claim 13, wherein the binder includes the cycloaliphatic group in a crosslinker compound.

* * * * *